(12) United States Patent
Nagasaki et al.

(10) Patent No.: US 12,435,791 B2
(45) Date of Patent: Oct. 7, 2025

(54) WHEEL DRIVE DEVICE

(71) Applicant: SUMITOMO HEAVY INDUSTRIES, LTD., Tokyo (JP)

(72) Inventors: Terumasa Nagasaki, Yokosuka (JP); Takuya Hirose, Obu (JP); Franz Rauh, Markt Indersdorf (DE)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 161 days.

(21) Appl. No.: 18/339,247

(22) Filed: Jun. 22, 2023

(65) Prior Publication Data

US 2024/0011564 A1 Jan. 11, 2024

(30) Foreign Application Priority Data

Jul. 8, 2022 (JP) ................................. 2022-110248

(51) Int. Cl.
*F16J 15/3272* (2016.01)

(52) U.S. Cl.
CPC ................................. *F16J 15/3272* (2013.01)

(58) Field of Classification Search
CPC ........................... F16J 15/3272; F16J 15/3268
See application file for complete search history.

(56) References Cited

U.S. PATENT DOCUMENTS

| | | | | |
|---|---|---|---|---|
| 4,988,218 A * | 1/1991 | Quaglia | ..................... | F16C 9/04 384/473 |
| 5,211,484 A * | 5/1993 | Quaglia | ................ | F16J 15/3272 384/473 |
| 5,988,341 A * | 11/1999 | Allen | ..................... | F16H 57/029 384/510 |
| 7,748,908 B2 * | 7/2010 | Aira | ........................ | F16C 33/10 384/385 |
| 2006/0002803 A1 * | 1/2006 | Aguilar | ................ | F16J 15/3272 417/407 |
| 2008/0000289 A1 * | 1/2008 | Furuse | ................. | F16J 15/3272 73/46 |
| 2008/0260521 A1 * | 10/2008 | Werro | ................... | F01D 11/003 415/170.1 |
| 2020/0256469 A1 * | 8/2020 | Owens, Jr. | ........... | F16J 15/3252 |

FOREIGN PATENT DOCUMENTS

| | | | | |
|---|---|---|---|---|
| JP | 61200704 | * | 12/1986 | |
| JP | 2008126950 A | * | 6/2008 | |
| JP | 2013199981 A | * | 10/2013 | ............... F16H 1/32 |
| JP | 2014077472 A | * | 5/2014 | |
| JP | 2016151295 A | * | 8/2016 | |
| JP | 2016161125 A | * | 9/2016 | ............... F16H 1/32 |
| JP | 2016178787 A | * | 10/2016 | ........... F16H 57/027 |
| JP | 2018128128 A | * | 8/2018 | |
| JP | 2018-144778 A | | 9/2018 | |
| JP | 2020060223 A | * | 4/2020 | |
| JP | 7145248 B2 | * | 9/2022 | ........... B60K 17/046 |

* cited by examiner

*Primary Examiner* — Eugene G Byrd
(74) *Attorney, Agent, or Firm* — HEA Law PLLC

(57) ABSTRACT

A wheel drive device that drives a wheel includes an output member, and a wheel member that is connected to the output member, in which the output member and the wheel member include a spigot fitting portion in which an outer peripheral spigot surface and an inner peripheral spigot surface are spigot-fitted, an anti-fretting agent is applied to the spigot fitting portion, and a seal member that prevents leakage of the anti-fretting agent is disposed between the output member and the wheel member.

14 Claims, 6 Drawing Sheets

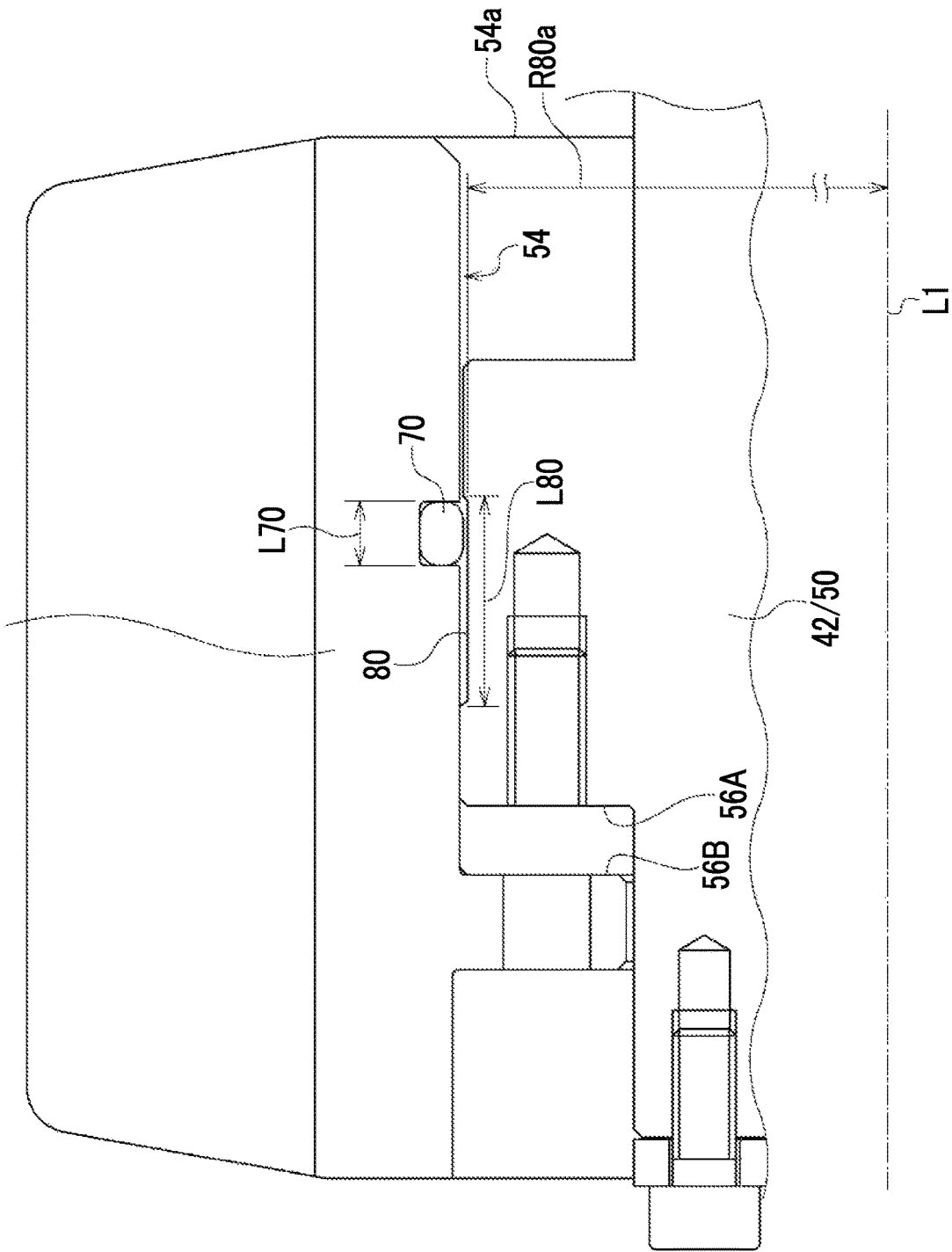

WHEEL DRIVE DEVICE

CROSS-REFERENCE TO RELATED APPLICATIONS

This application claims priority to Japanese Patent Application No. 2022-110248, filed on Jul. 8, 2022, which is incorporated by reference herein in its entirety.

BACKGROUND

Technical Field

Certain embodiments of the present invention relate to a wheel drive device.

Description of Related Art

In the related art, a wheel drive device including an output member and a wheel member connected to the output member is disclosed. The output member and the wheel member include a spigot fitting portion in which an outer peripheral spigot surface and an inner peripheral spigot surface are spigot-fitted.

SUMMARY

According to an embodiment of the present invention, there is provided a wheel drive device that drives a wheel and including an output member and a wheel member that is connected to the output member, in which the output member and the wheel member include a spigot fitting portion in which an outer peripheral spigot surface, which is provided in one of the output member and the wheel member, and an inner peripheral spigot surface, which is provided in the other, are spigot-fitted, an anti-fretting agent is applied to the spigot fitting portion, and a seal member that prevents leakage of the anti-fretting agent is disposed between the output member and the wheel member.

BRIEF DESCRIPTION OF THE DRAWINGS

FIG. 6 is a view showing an intermediate state of inserting an inner member into an insertion hole of an outer member of FIG. 5.

DETAILED DESCRIPTION

Figure 1:
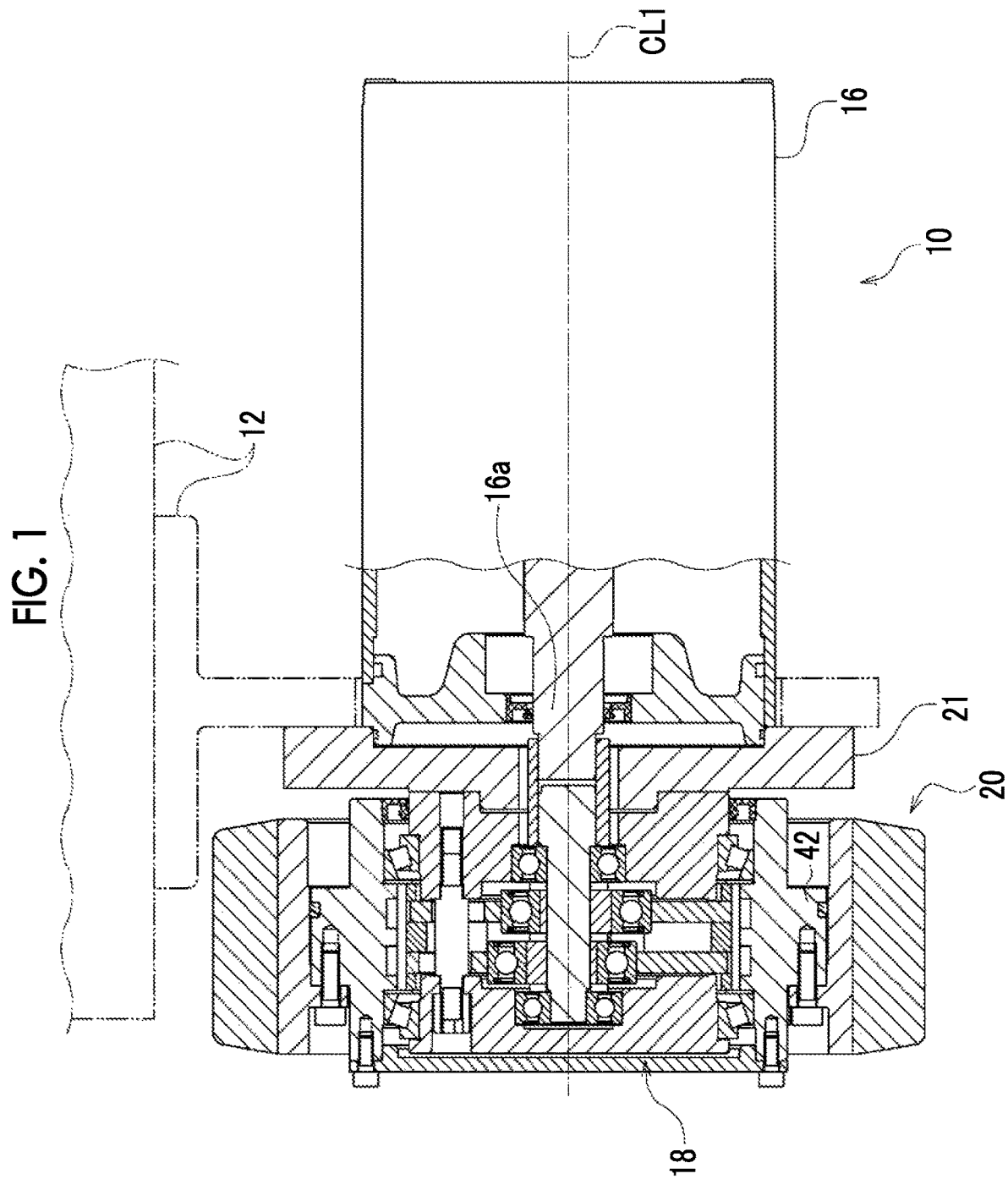
FIG. 1 is a side sectional view illustrating a power transmission device of one embodiment.

Fretting wear is likely to occur at the spigot fitting portion between the output member and the wheel member. The inventors of the present application have found a new idea for suppressing the fretting wear at the spigot fitting portion.

It is desirable to provide a technique capable of suppressing fretting wear at a spigot fitting portion between an output member and a wheel member.

According to the present invention, it is possible to suppress the fretting wear at the spigot fitting portion between the output member and the wheel member. Hereinafter, embodiments will be described. The same reference numerals are added to the same components, and duplicated description will be omitted. In each drawing, components are omitted, enlarged, or reduced as appropriate for convenience of explanation. The drawings shall be viewed according to the orientation of the reference numerals.

One Embodiment

FIG. 1 is referred to. A wheel drive device 10 is attached to a vehicle body 12 such as a transport cart and is used to drive a wheel 20. The transport cart is, for example, an automatic guided vehicle (AGV), an autonomous mobile robot (AMR), or the like. A use of the wheel drive device 10 of the present invention is not limited to the transport cart, and can be applied to various vehicles, such as a forklift and a self-propelled service robot.

The wheel drive device 10 includes a drive source 16, a speed reducer 18 to which input rotation is input from an output shaft 16a of the drive source 16, and a wheel 20 to which output rotation is output from an output member 42 of the speed reducer 18. For example, the drive source 16 is a motor, a gear motor, an engine, or the like. In addition to this, the wheel drive device 10 includes an attachment member 21 that is attached to the vehicle body 12 and supports each of the drive source 16 and the speed reducer 18. Hereinafter, a direction along a rotation center line CL1 of the output member 42 is referred to as an axial direction, and a radial direction and a circumferential direction having the rotation center line as the center of a circle are simply referred to as a radial direction and a circumferential direction.

Figure 2:
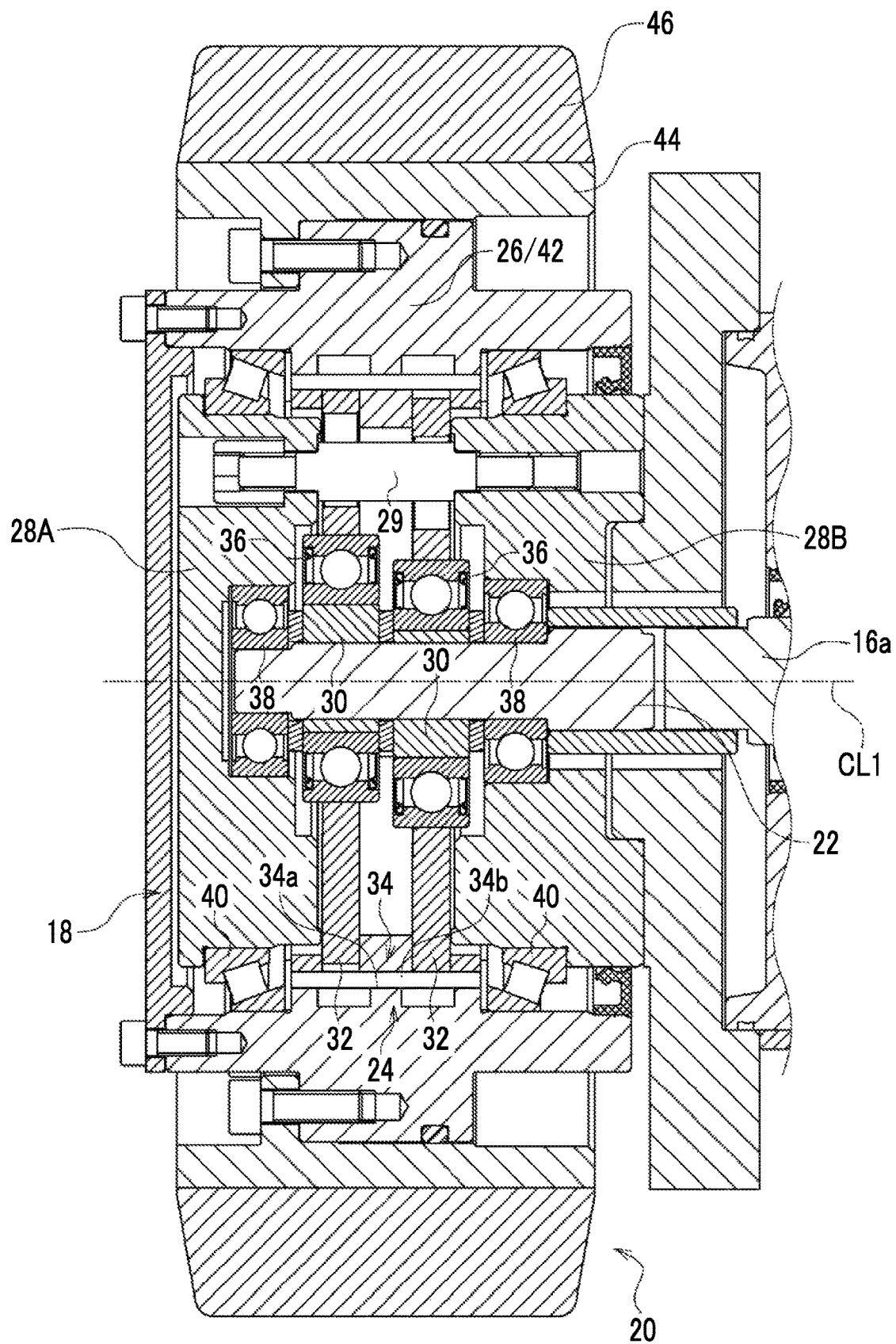
FIG. 2 is a side sectional view illustrating a speed reducer of the one embodiment.

FIG. 2 is referred to. The speed reducer 18 includes an input shaft 22 to which input rotation is input from the output shaft 16a of the drive source 16, a reduction mechanism 24 that decelerates the input rotation transmitted from the input shaft 22 and that converts the input rotation into output rotation, a casing 26 that accommodates the reduction mechanism 24, and carriers 28A and 28B disposed inside the casing 26 in the radial direction are provided.

The speed reducer 18 in the present embodiment is an eccentric oscillation type speed reducer. The input shaft 22 of the speed reducer 18 is a crankshaft having at least one (here, two) eccentric body 30. Eccentric phases of a plurality of eccentric bodies 30 are offset from each other. The input shaft 22 and the eccentric body 30 may be either separate or integral.

The reduction mechanism 24 of the eccentric oscillation type speed reducer 18 includes an external gear 32 that oscillates by the eccentric body 30 and an internal gear 34 that meshes with the external gear 32. The external gear 32 is individually provided corresponding to each of the plurality of eccentric bodies 30, and is supported by the eccentric body 30 to be relatively rotatable through an eccentric body bearing 36. The internal gear 34 in the present embodiment includes an internal gear main body 34a integrated with the casing 26, and an outer pin 34b provided on an inner peripheral portion of the internal gear main body 34a and constituting internal teeth.

The carriers 28A and 28B are disposed on one side in the axial direction of the reduction mechanism 24. The carriers 28A and 28B in the present embodiment include a first carrier 28A disposed on one side in the axial direction and a second carrier 28B disposed on the other side in the axial direction. The carriers 28A and 28B are connected through a connection member 29 such as a pin. The carriers 28A and 28B support the input shaft 22 through an input bearing 38. A main bearing 40 is disposed between the casing 26 and the carriers 28A and 28B.

The speed reducer 18 described above includes an output member 42 to which output rotation is transmitted from the reduction mechanism 24 and outputting the output rotation. The output member 42 in the present embodiment forms a tubular shape as a whole. The output member 42 in the present embodiment is the casing 26, but the carriers 28A and 28B may be used in place of the casing 26. Details of the output member 42 will be described later.

The wheel 20 travels on a traveling surface by being rotated by the output rotation output from the output member 42. For example, the traveling surface is a floor surface of a building, a rail, or the like. The wheel 20 includes a wheel member 44 that is connected to the output member 42, and a ground contact member 46 that is attached to an outer peripheral portion of the wheel member 44. The wheel member 44 forms a tubular shape as a whole. Details of the wheel member 44 will be described later. The ground contact member 46 contacts the traveling surface when the wheel 20 travels. The ground contact member 46 in the present embodiment is a tire. Specific examples of the ground contact member 46 are not particularly limited, and in addition, a roller for an omni wheel, a roller for a mecanum wheel, or the like may be used.

An operation of the wheel drive device 10 described above will be described. In a case where the input rotation is input from the drive source 16 to the input shaft 22 of the speed reducer 18, the reduction mechanism 24 operates. In a case where the reduction mechanism 24 operates, the output rotation decelerated with respect to the input rotation from the reduction mechanism 24 is transmitted to the output member 42. In a case where the output rotation is transmitted to the output member 42, the wheel 20 rotates together with the output member 42, and the wheel 20 travels on the traveling surface.

In a case where the eccentric oscillation type speed reducer 18 is used as in the present embodiment, in a case where the input shaft 22 (crankshaft) rotates, the eccentric body 30 causes the external gear 32 to oscillate so that the center of the external gear 32 rotates around the rotation center line CL1 of the output member 42. In a case where the external gear 32 is oscillated, meshing positions of the external gear 32 and the internal gear 34 change in the circumferential direction. Accordingly, each time the input shaft 22 rotates once, one of the external gear 32 and the internal gear 34 (here, the internal gear 34) rotates by a difference in the number of teeth between the external gear 32 and the internal gear 34. The axial rotation component is transmitted to the output member 42 as output rotation.

Figure 3:
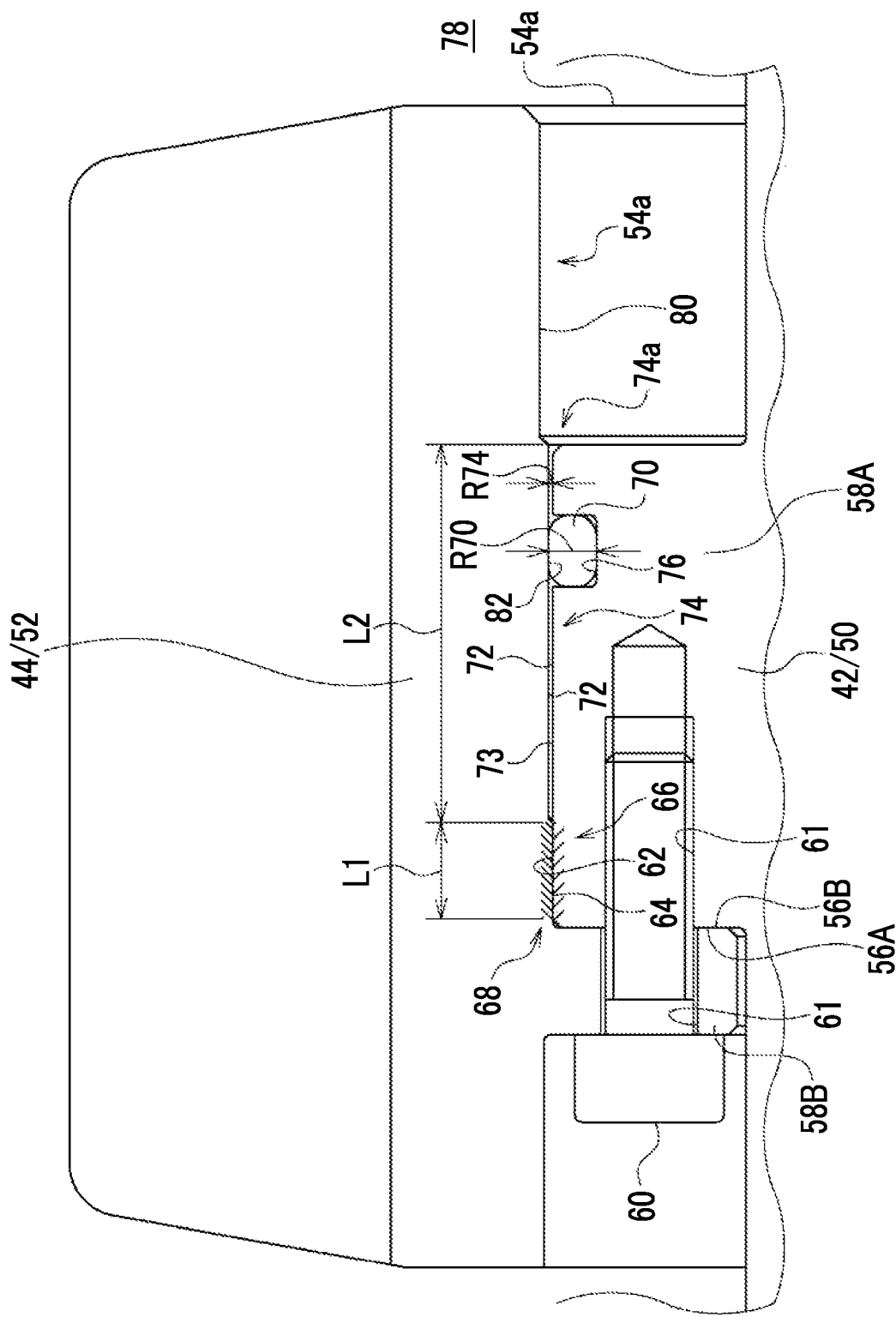
FIG. 3 is an enlarged view of a part of FIG. 2.

FIG. 3 will be referred to. Hatching is omitted in the following drawings. One of the output member 42 and the wheel member 44 is an inner member 50, and the other is an outer member 52. In the present embodiment, the inner member 50 is the output member 42, and the outer member 52 is the wheel member 44. At least a part of the inner member 50 is disposed inward of the outer member 52 in the radial direction.

An insertion hole 54 into which the inner member is inserted toward one side in the axial direction (here, a counter motor side) is provided on an inner peripheral surface of the outer member 52. The insertion hole 54 includes an opening portion 54a that opens toward the other side in the axial direction (here, a motor side).

The inner member 50 and the outer member 52 respectively include axial abutment portions 56A and 56B that abut in the axial direction. The inner member 50 includes a first axial abutment portion 56A, and the outer member 52 includes a second axial abutment portion 56B that abuts against the first axial abutment portion 56A in the axial direction. In the present embodiment, the first axial abutment portion 56A is provided on a side surface portion of a first protrusion portion 58A that protrudes outwardly in the radial direction on an outer peripheral surface of the inner member 50. In addition, the second axial abutment portion 56B is provided on a side surface portion of the second protrusion portion 58B that protrudes inwardly in the radial direction on the inner peripheral surface of the outer member 52.

The output member 42 and the wheel member 44 are connected by a connection member 60. The output member 42 and the wheel member 44 in the present embodiment are connected by the connection member 60 at the respective axial abutment portions 56A and 56B. The connection member 60 in the present embodiment is a bolt, but may also be a rivet, a pin, or the like. A plurality of the connection members 60 are disposed with a space in the circumferential direction. The inner member 50 and the outer member 52 include an insertion hole 61 for inserting the connection member 60. In the present embodiment, the insertion hole 61 of the inner member 50 is a female screw hole, and the insertion hole 61 of the outer member 52 is a non-screw hole. The connection member 60 is inserted into the insertion holes 61 of the inner member 50 and the outer member 52 in the axial direction, and connects the inner member 50 and the outer member 52 in a state in which the respective axial abutment portions 56A and 56B are abutted.

The inner member 50 and the outer member 52 include a spigot fitting portion 66 in which an outer peripheral spigot surface 62 and an inner peripheral spigot surface 64 are spigot-fitted. The outer peripheral spigot surface 62 is provided on an outer peripheral surface of the inner member 50 (here, the output member 42), and the inner peripheral spigot surface 64 is provided on the inner peripheral surface of the outer member 52 (here, the wheel member 44). The wheel member 44 is connected in a state in which the output member 42 and the wheel member 44 are spigot-fitted at the spigot fitting portion 66.

An anti-fretting agent 68 is applied to the spigot fitting portion 66. It can also be said that the anti-fretting agent 68 is applied to the outer peripheral spigot surface 62 and the inner peripheral spigot surface 64. In FIG. 3, hatching is applied to an application location of the anti-fretting agent 68. The anti-fretting agent 68 has a function of preventing fretting wear caused by contact between the outer peripheral spigot surface 62 and the inner peripheral spigot surface 64. Specific examples of the anti-fretting agent 68 are not particularly limited, and a liquid lubricant such as wax, oil, and fatty acid may be used in addition to a solid lubricant such as molybdenum disulfide and graphite, for example. In a case where the solid lubricant is used as the anti-fretting agent 68, a mixture of the solid lubricant in a form of powder and a lubricating oil such as grease and oil may be used as the anti-fretting agent 68.

A seal member 70 that prevents the anti-fretting agent 68 from leaking into an external space is disposed between the inner member 50 and the outer member 52. For example, the seal member 70 is a contact type seal such as an O-ring and a lip seal, and here, the seal member 70 is the O-ring. The seal member 70 in the present embodiment is composed of an elastic body such as rubber. This seal member 70 is disposed between the inner member 50 and the outer member 52 with elastic deformation. The seal member 70 is disposed on one side in the axial direction with respect to the spigot fitting portion 66, and prevents the anti-fretting agent 68 from leaking to the one side in the axial direction.

Each of the inner member 50 and the outer member 52 includes a pair of radial facing portions 72 facing each other in the radial direction. The spigot fitting portion 66 is provided on the pair of radial facing portions 72. The seal member 70 is disposed between the pair of radial facing portions 72. In the present embodiment, the radial facing portion 72 of the inner member 50 is provided on an outermost diameter portion 73 having the largest outer diameter in an axial range facing the inner peripheral surface of the outer member 52 in the radial direction. The radial facing portion 72 of the outer member 52 is provided at a position overlapping the radial facing portion 72 of the outermost diameter portion 73 in the radial direction.

At least one of the inner member 50 and the outer member 52 is provided with a recessed portion 76 that accommodates the seal member 70. The recessed portion 76 is provided as an annularly continuous groove portion. Accordingly, by accommodating the seal member 70 in one recessed portion 76 of the inner member 50 and the outer member 52, the seal member 70 can be mounted to the one recessed portion 76. The recessed portion 76 in the present embodiment is provided on the outer peripheral surface of the inner member 50 (here, the output member 42), and the seal member 70 can be mounted to the inner member 50. Accordingly, when the wheel drive device 10 is assembled, the seal member 70 is less likely to come off than when the seal member 70 is accommodated in the recessed portion 76 of the outer member 52, so that good workability can be obtained.

A radial gap 74 that is adjacent to the spigot fitting portion 66 in the axial direction is provided between the pair of radial facing portions 72. A part of the radial gap 74 is closed by the seal member 70. The radial gap 74 includes an opening end portion 74a that is provided between end portions of the pair of radial facing portions 72 and opens in the axial direction. In a case where the inner member 50 and the outer member 52 are provided with the recessed portion 76 that accommodates the seal member 70, the radial gap 74 is provided at a location excluding the recessed portion 76. By providing the radial gap 74 between the pair of radial facing portions 72, an axial dimension L1 of the spigot fitting portion 66, which causes fretting wear in the pair of radial facing portions 72, can be shortened by the amount of an axial dimension L2 of the radial gap 74. As a result, the fretting wear can be suppressed as compared with a case where the radial gap 74 is not provided between the pair of radial facing portions 72.

A gap between the pair of radial facing portions 72 in the radial gap 74 is wider than a gap between the pair of radial facing portions 72 in the spigot fitting portion 66. The radial dimension R74 of the radial gap 74 is smaller than a thickness dimension R70 of the seal member 70. Here, the thickness dimension R70 refers to a radial dimension obtained by subtracting an inner diameter dimension from an outer diameter dimension of the seal member 70.

The seal member 70 is provided at an intermediate position of the radial gap 74 in the axial direction. It can be said that the seal member 70 is not provided at the opening end portion 74a of the radial gap 74. Accordingly, the radial gap 74 can be widened with respect to the seal member 70 on the side opposite to the spigot fitting portion 66 in the axial direction, rather than the disposition position of the seal member 70 being the opening end portion 74a of the radial gap 74. As a result, it becomes difficult for only a foreign matter having a dimension smaller than the radial gap 74 to reach the seal member 70 from the external space, and the seal member 70 can be protected from contact with a foreign matter having a large dimension.

The axial abutment portions 56A and 56B of the output member 42 and the wheel member 44 are disposed on the side opposite to the seal member 70 in the axial direction with respect to the spigot fitting portion 66. At least one of the first axial abutment portion 56A and the second axial abutment portion 56B (both in the present embodiment) may satisfy this condition. Accordingly, the axial abutment portions 56A and 56B abutting against each other can prevent the anti-fretting agent 68 from leaking to the spigot fitting portion 66 on the side opposite to the seal member 70 in the axial direction. As a result, other seal members for preventing leakage of the anti-fretting agent 68 can be omitted. In addition, by adopting the bolt as the connection member 60, the axial abutment portions 56A and 56B can be brought into close contact with each other by tightening force of the bolt. As a result, the leakage of the anti-fretting agent 68 can be effectively suppressed by the axial abutment portions 56A and 56B abutting against each other.

Effects of the wheel drive device 10 described above will be described.

The anti-fretting agent 68 is applied to the spigot fitting portion 66 between the output member 42 and the wheel member 44. Accordingly, the fretting wear at the spigot fitting portion 66 can be suppressed. As a result, durability of the wheel drive device 10 can be improved.

The seal member 70 that prevents the leakage of the anti-fretting agent 68 is disposed between the output member 42 and the wheel member 44. Accordingly, the scattering of the anti-fretting agent 68 into an external space 78 can be suppressed. As a result, a state in which the anti-fretting agent 68 is applied to the spigot fitting portion 66 can be maintained for a long period of time, and the fretting wear suppression effect by the anti-fretting agent 68 can be exhibited for a long period of time. In addition, the seal member 70 can suppress intrusion of foreign matters from the external space 78 into the spigot fitting portion 66.

Next, other features of the wheel drive device 10 will be described. Between the output member 42 and the wheel member 44, a radial load is transmitted. In a case where a function of transmitting the radial load is exclusively exhibited in the spigot fitting portion 66, it is preferable that the axial dimension L1 of the spigot fitting portion 66 is made longer in order to reduce a contact pressure at the spigot fitting portion 66. On the other hand, in the present embodiment, the function of transmitting the radial load between the output member 42 and the wheel member 44 is exclusively exhibited by a plurality of connection members 60 in place of the spigot fitting portion 66. In addition, the spigot fitting portion 66 in the present embodiment is exclusively used to position the output member 42 and the wheel member 44 in the radial direction.

In exhibiting such positioning function, the axial dimension L1 of the spigot fitting portion 66 may be short. Rather, as a countermeasure against fretting wear, it is preferable that the axial dimension L1 of the spigot fitting portion 66, which causes the fretting wear, is shortened. In addition, as the axial dimension L1 of the spigot fitting portion 66 becomes shorter, frictional resistance is less likely to occur in a case where the inner member 50 is inserted into the insertion hole 54 of the outer member 52.

From such a viewpoint, it is preferable that the axial dimension L1 of the spigot fitting portion 66 is set to a size that is equal to or less than half the total dimension (=L1+L2) of the axial dimension L1 of the spigot fitting portion 66 and the axial dimension L2 of the radial gap 74. Although a lower limit value is not particularly limited, for example, 4 mm or more may be a lower limit value, and preferably 5 mm or more may be a lower limit value. Accordingly, the axial dimension L1 of the spigot fitting portion 66 can be shortened as compared with a case where the axial dimension L1 of the spigot fitting portion 66 is set to a size that is more than half of the total dimension (=L1+L2). As a result, the occurrence of fretting wear can be suppressed as compared with such a case. In addition, as compared with such a case, the workability in a case where the inner member 50 is inserted into the insertion hole 54 of the outer member 52 can be improved. The axial dimension L1 of the spigot fitting portion 66 may have a size that is more than half of the total dimension (=L1+L2).

As described above, the seal member 70 is mounted to the outer peripheral surface of the inner member 50. To realize this, in the present embodiment, the seal member 70 is accommodated in the recessed portion 76 provided on the outer peripheral surface of the inner member 50. Specific examples for mounting the seal member 70 is not particularly limited, and tightening, fitting, or the like may be used.

Figure 4:
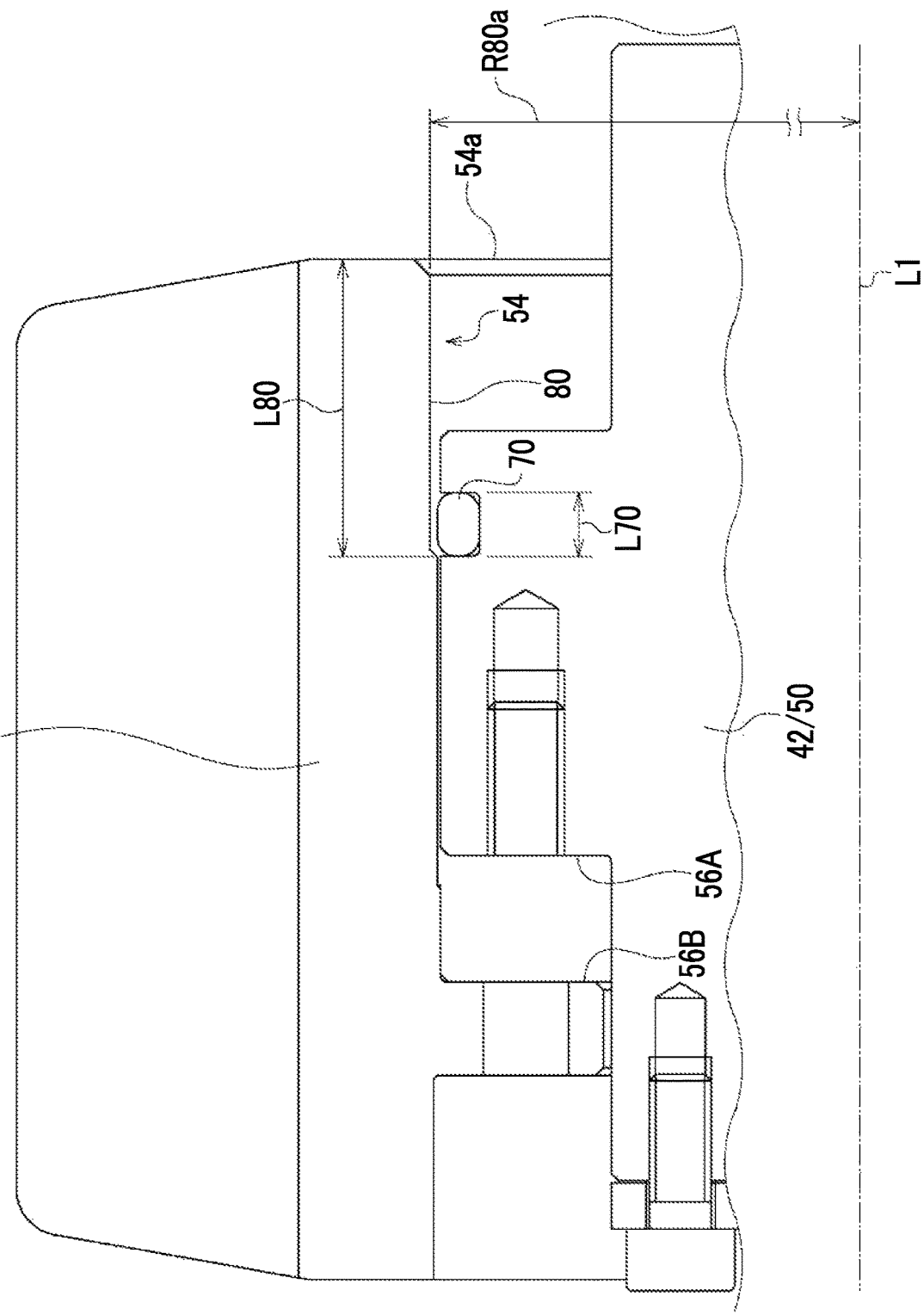
FIG. 4 is a view showing an intermediate state of inserting an inner member into an insertion hole of an outer member of FIG. 3.

FIGS. 3 and 4 are referred to. In a case where the inner member 50 is inserted into the insertion hole 54, the inner member 50 passes through the opening portion 54a of the insertion hole 54 and then is moved until the first axial abutment portion 56A abuts against the second axial abutment portion 56B of the outer member 52.

Here, a relief recessed portion 80 is provided on the inner peripheral surface of the outer member 52 to reduce the frictional resistance of the seal member 70 in a case where the inner member 50 is inserted into the insertion hole 54. In a case where the relief recessed portion 80 is provided on the inner peripheral surface of the outer member 52, the relief recessed portion 80 is provided between a contact location 82 of the seal member 70 with respect to the inner peripheral surface of the outer member 52 and the opening portion 54a of the insertion hole 54. In the present embodiment, the relief recessed portion 80 is provided between the radial facing portion 72 of the outer member 52 and the opening portion 54a of the insertion hole 54. The relief recessed portion 80 is provided to be recessed outwardly in the radial direction from the contact location 82 of the seal member 70 on the inner peripheral surface of the outer member 52. An inner diameter R80a of the relief recessed portion 80 may be set to a size capable of avoiding contact with the seal member 70 mounted on the inner member 50. For example, the axial dimension L80 of the relief recessed portion 80 is larger than an axial dimension L70 of the seal member 70.

Accordingly, the frictional resistance of the seal member 70 can be reduced as compared with a case where the relief recessed portion 80 is not provided on the inner peripheral surface of the outer member 52. As a result, it becomes easier to insert the inner member 50 into the insertion hole 54 of the outer member 52, and good workability can be obtained.

Another Embodiment

Figure 5:
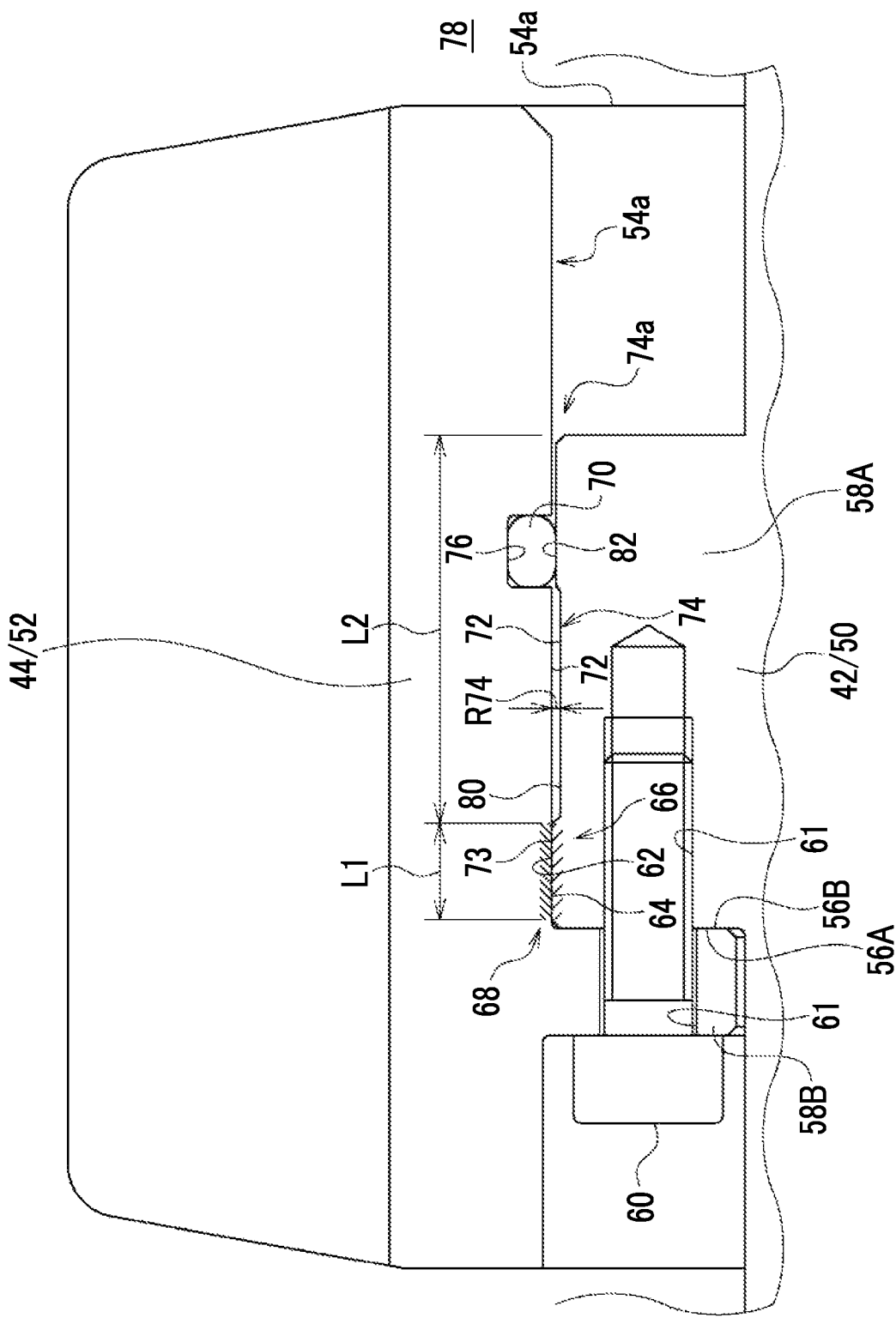
FIG. 5 is a view of a power transmission device of another embodiment as viewed from the same viewpoint as in FIG. 3.

FIGS. 5 and 6 are referred to. The seal member in the present embodiment is mounted on the inner peripheral surface of the outer member 52 in place of the outer peripheral surface of the inner member 50. To realize this, the recessed portion 76 that accommodates the seal member 70 is provided on the inner peripheral surface of the outer member 52.

The relief recessed portion 80 is provided on the outer peripheral surface of the inner member 50 in place of the inner peripheral surface of the outer member 52. In a case where the relief recessed portion 80 is provided on the outer peripheral surface of the inner member 50, the relief recessed portion 80 is provided between the contact location 82 of the seal member 70 with respect to the outer peripheral surface of the inner member 50 and the spigot fitting portion 66. The relief recessed portion 80 is provided to be recessed inwardly in the radial direction from the contact location 82 of the seal member 70 on the outer peripheral surface of the inner member 50. An outer diameter R80b of the relief recessed portion 80 may be set to a size capable of avoiding contact with the seal member 70 mounted on the outer member 52. For example, the axial dimension L80 of the relief recessed portion 80 is larger than the axial dimension L70 of the seal member 70.

Accordingly, as compared with a case where the relief recessed portion 80 is not provided on the outer peripheral surface of the inner member 50, the frictional resistance of the seal member 70 can be reduced as in the one embodiment. In relation to such an effect, the seal member may be mounted to one of the inner peripheral surface of the outer member 52 and the outer peripheral surface of the inner member 50, and the relief recessed portion 80 may be provided on the other.

Next, modification examples of each component described so far will be described.

Specific examples of the speed reducer 18 are not particularly limited, and various reduction mechanisms can be applied, such as a bending meshing type speed reducer, a simple planetary gear type speed reducer, a traction drive, or the like, in addition to the eccentric oscillation type speed reducer. The type of the eccentric oscillation type speed reducer is not particularly limited. As an example of this, the center crank type in which the crankshaft (input shaft 22) is disposed on the rotation center line of the output member 42 has been described in the embodiment. In addition to this, it may be a distribution type in which a plurality of crankshafts are disposed at positions offset in the radial direction from the rotation center line of the output member 42. The type of the bending meshing type speed reducer is not particularly limited, and may be, for example, a cup type having one internal gear, a silk hat type, or the like in addition to a tubular type having two internal gears.

One of the output member 42 and the wheel member 44 may be the inner member 50 having the outer peripheral spigot surface 62, and the other may be the outer member 52 having the inner peripheral spigot surface 64. To realize this, unlike the embodiment, the wheel member 44 may be the inner member 50, and the output member 42 may be the outer member 52.

The radial gap 74 that is adjacent to the spigot fitting portion 66 in the axial direction may not be provided between the pair of radial facing portions 72. It can also be said that the axial range of the spigot fitting portion 66 may be adjacent to a range overlapping the seal member 70 in the radial direction.

The seal member 70 may be provided at the opening end portion 74a of the radial gap 74.

The recessed portion 76 may be provided on at least one of the output member 42 and the wheel member 44. The recessed portion 76 may be provided on both the inner peripheral surface of the outer member 52 and the outer peripheral surface of the inner member 50 unlike the embodiment. In addition, neither the output member 42 nor the wheel member 44 may have the recessed portion 76 that accommodates the seal member 70.

The seal member 70 may be disposed individually on both sides in the axial direction with respect to the spigot fitting portion 66. The seal member 70 may be disposed only on the side of the axial abutment portions 56A and 56B with respect to the spigot fitting portion 66 unlike the embodiment. Each of the output member 42 and the wheel member 44 may not include the axial abutment portions 56A and 56B.

Neither the inner member 50 nor the outer member 52 may be provided with the relief recessed portion 80.

The above-described embodiments and modification examples are examples. The technical ideas that abstract the embodiments and modification examples should not be construed as being limited to the contents of the embodiments and modification examples. Many design changes such as the change, addition, and deletion of components can be made with respect to the contents of the embodiments and modification examples. In the above-described embodiments, the contents for which such design changes are possible are emphasized by adding the notation "embodiment". However, design changes are allowed even in the contents in which there is no such notation. Hatching applied to the cross section of the drawing does not limit the material of the hatched object. Structures and numerical values as mentioned in the embodiments and modification examples naturally include those that can be regarded as the same when manufacturing errors and the like are taken into consideration.

Any combination of the above components is also valid. For example, any description of other embodiments may be combined with the embodiment, or the modification examples may be combined with any description of the embodiments and modification examples.

A component composed of a single member in an embodiment may be composed of a plurality of members.

Similarly, a component composed of a plurality of members in an embodiment may be composed of a single member.

It should be understood that the invention is not limited to the above-described embodiment, but may be modified into various forms on the basis of the spirit of the invention. Additionally, the modifications are included in the scope of the invention.

What is claimed is:

1. A wheel drive device that drives a wheel, comprising:
   an output member; and
   a wheel member that is connected to the output member,
      wherein the output member and the wheel member include a spigot fitting portion in which an outer peripheral spigot surface and an inner peripheral spigot surface are spigot-fitted,
   an anti-fretting agent is applied to the spigot fitting portion, and
   a seal member that prevents leakage of the anti-fretting agent is disposed between the output member and the wheel member, wherein the seal member is disposed between a pair of radial facing portions provided in the output member and the wheel member, respectively, and
   wherein a radial gap is provided at a position being different from a position of the spigot fitting portion in the axial direction between the seal member and the spigot fitting portion, and is interposed between the output member and the wheel member in a radial direction, and a distance between the pair of radial facing portions at the radial gap is wider than a distance between the pair of radial facing portions at the spigot fitting portion.

2. The wheel drive device according to claim 1,
   the radial gap adjacent to the spigot fitting portion in an axial direction is provided between the pair of radial facing portions.

3. The wheel drive device according to claim 2,
   wherein the seal member is provided at an intermediate position of the radial gap in the axial direction.

4. The wheel drive device according to claim 2,
   wherein an axial dimension of the spigot fitting portion is a size that is equal to or less than half a total dimension of the axial dimension of the spigot fitting portion and an axial dimension of the radial gap.

5. The wheel drive device according to claim 1,
   wherein a recessed portion that accommodates the seal member is provided in at least one of the output member and the wheel member.

6. The wheel drive device according to claim 5,
   wherein one of the wheel member and the output member is an inner member including the outer peripheral spigot surface, and
   the recessed portion is provided on an outer peripheral surface of the inner member.

7. The wheel drive device according to claim 1,
   wherein the output member and the wheel member respectively include axial abutment portions, the axial abutment portions abutting against each other in an axial direction, and
   the axial abutment portions are disposed on a side opposite to the seal member in the axial direction with respect to the spigot fitting portion.

8. The wheel drive device according to claim 1,
   wherein one of the wheel member and the output member is an inner member including the outer peripheral spigot surface, and the other is an outer member including the inner peripheral spigot surface,
   an insertion hole into which the inner member is inserted in an axial direction is provided on the outer member,
   the seal member is mounted on one of an inner peripheral surface of the outer member and an outer peripheral surface of the inner member, and
   a relief recessed portion for reducing frictional resistance of the seal member in a case where the inner member is inserted into the insertion hole is provided on the other of the inner peripheral surface of the outer member and the outer peripheral surface of the inner member.

9. The wheel drive device according to claim 1, wherein the seal member is disposed on one side in an axial direction with respect to the spigot fitting portion, and prevents the anti-fretting agent from leaking to an external space side through a part of the radial gap, and
   the part of the radial gap is not in communication with other space.

10. The wheel drive device according to claim 1, further comprising:
    a speed reducer includes an input shaft to which input rotation is input, and a reduction, mechanism that decelerates the input rotation transmitted from the input shaft, and
    wherein the output member outputs rotation transmitted from the reduction mechanism.

11. The wheel drive device according to claim 10,
    wherein the input includes an eccentric body, wherein the reduction mechanism includes an external gear that oscillates by the eccentric body and an internal gear that meshes with the external gear, the wheel drive device further comprising:

an eccentric body bearing disposed between the external gear and the eccentric body; and a carrier disposed on one side in an axial direction of the external gear, wherein the internal gear is integrated with a casing accommodating the reduction mechanism, and wherein one of the casing or the carrier is the output member.

12. The wheel drive device according to claim 1, wherein one of the wheel member and the output member is an inner member including the outer peripheral spigot surface, and the other is an outer member including the inner peripheral spigot surface, wherein an insertion hole into which the inner member is inserted from one side in an axial direction is provided on the outer member, and wherein a diameter of an outer peripheral surface of the inner member on the one side in the axial direction is equal to or smaller than a diameter of the inner peripheral spigot surface.

13. The wheel drive device according to claim 1, wherein the wheel member and the output member include an axial abutment portion that abut in an axial direction each other, wherein each of the wheel member and the output member include an insertion hole for inserting a connection member, and wherein the wheel member and the output member are connected by the connection member inserted into the insertion hole of each of the wheel member and the output member in a state in which the respective axial abutment portions are abutted.

14. The wheel drive device according to claim 13, wherein the seal member is disposed on a side opposite to the axial abutment portions in the axial direction with respect to the spigot fitting portion, wherein the seal member prevents the anti-fretting agent from leaking to one side in the axial direction with respect to the spigot fitting portion, and wherein the axial abutment portions prevent the anti-fretting agent from leaking to other side in the axial direction with respect to the spigot fitting portion by the axial abutment portions being brought into close contact with each other by the connection member.

* * * * *